United States Patent [19]
Yoshino

[11] 3,886,689
[45] June 3, 1975

[54] APPARATUS FOR FORMING A TROCHOIDAL SURFACE

[75] Inventor: Tsutomu Yoshino, Hiroshima, Japan

[73] Assignee: Toyo Kogyo Co., Ltd., Hiroshima, Japan

[22] Filed: Oct. 4, 1973

[21] Appl. No.: 403,483

[30] Foreign Application Priority Data
Oct. 5, 1972 Japan............................ 47-100067

[52] U.S. Cl. ................... 51/43; 51/90; 51/DIG. 32; 90/15 A
[51] Int. Cl............................ B24b 5/16; B23c 3/04
[58] Field of Search................... 51/43, 90, DIG. 32; 90/15 A

[56] References Cited
UNITED STATES PATENTS
2,693,066  11/1954  Berstecher......................... 51/43 X
2,870,578  1/1959  Baier.............................. 51/DIG. 32

*Primary Examiner*—Al Lawrence Smith
*Assistant Examiner*—Nicholas P. Godici
*Attorney, Agent, or Firm*—Fleit & Jacobson

[57] ABSTRACT

An apparatus for forming trochoidal surface which can form the trochoidal surface with three tools. The apparatus comprises a stationary sun gear, three planetary gears disposed around and meshing with said sun gear at equi-distant angular positions, each of said planetary gears having gear ratio of 1:2 to said sun gear, a rotatable forming tool having a working surface and mounted on the planetary gear with said working surface positioned at a point offset by a predetermined distance from center of said planetary gear, and means for producing revolutional movements of said planetary gears.

10 Claims, 15 Drawing Figures

APPARATUS FOR FORMING A TROCHOIDAL SURFACE

The present invention relates to an apparatus for forming a trochoidal surface on a workpiece such as by machining, cutting or honing.

Conventionally a trochoidal surface has been formed on a workpiece by a grinding wheel or the like which is moved along a trochoidal or a like non-circular path by means of a non-circular motion producing mechanism or a template having a configuration similar to that of the work surface. Recent development of rotary piston type engines has contributed to a progress of trochoidal-motion producing mechanism which is utilized in a machine for grinding a trochoidal rotor housing. In the U.S. Pat. No. 2,870,578, there is disclosed a mechanism which may be utilized for such a purpose. However, in the conventional grinding apparatus, a single grinding wheel is combined with a single trochoidal-motion producing mechanism, so that it has not been possible to form a precise trochoidal surface on a workpiece with a high rate.

Therefore, the present invention has an object to provide an apparatus for forming a trochoidal surface with a high rate.

Another object of the present invention is to provide an apparatus in which three grinding wheels are combined with a trochoidal-motion producing mechanism.

A further object of the present invention is to provide a novel and effective apparatus for forming a trochoidal surface on a workpiece.

According to the present invention, there is provided an apparatus for forming a trochoidal surface comprising a stationary sun gear, three planetary gears disposed around and meshing with said sun gear at equidistant angular positions, each of said planetary gear having gear ratio of 1:2 to said sun gear, a rotatable forming tool having a working surface and mounted on the planetary gear with said working surface positioned at a point offset by a predetermined distance from center of said planetary gear, and means for producing revolutional movements of said planetary gears.

According to a further aspect of the present invention, each of said forming tools is mounted on said planetary gear through a tool mounting head which comprises a swingable arm carried by a shaft coaxial with said offset point on the planetary gear, said swingable arm carrying said tool axially slidably thereon, a lever extending along a line through said offset point on each planetary gear and meshing point between the related planetary gear and the sun gear, said lever having one end longitudinally slidably receiving the related swingable arm, the other end of the lever being pivotally mounted on a rotatable member rotatable about an axis coaxial with said sun gear at a common point thereon together with the other two levers, said common point being offset from the axis of the sun gear two times the offset distance of said offset point on each planetary gear, and means for feeding each of said tools along said swingable arm so as to compensate any wear of the working surface thereof. According to the feature of the invention, the tool can always be fed in the direction normal to the trochoidal surface to be formed.

These and other objects and features of the present invention will become apparent from the following descriptions of a preferred embodiment of the present invention taking reference to the accompanying drawings, in which.

Figure 12:
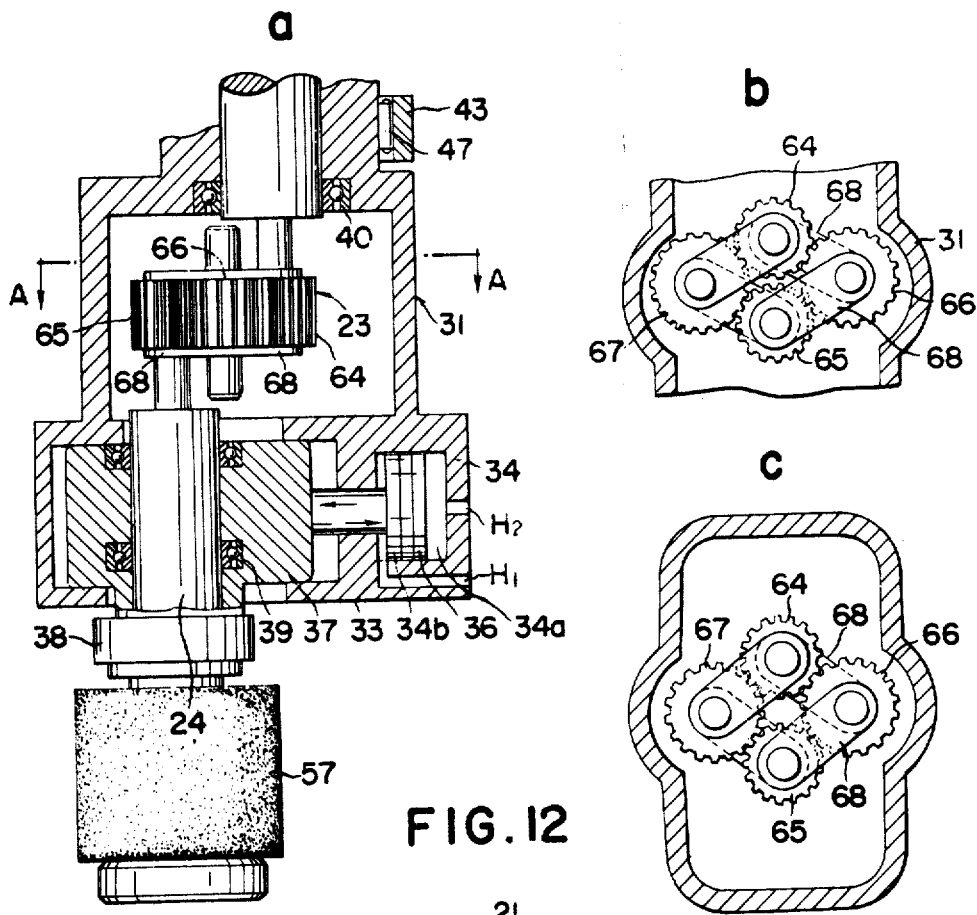
FIG. 12($a$) is a sectional view showing another form of the rotation transmitting mechanism.
Figure 13:
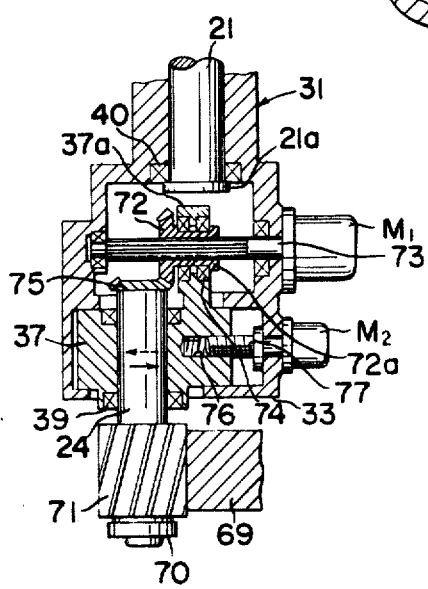

FIGS. 12($b$) and ($c$) are sectional views taken along the line A—A in FIG. 12($a$) for showing the operation of the mechanism; and, FIG. 13 is a fragmentary sectional view showing another embodiment of the present invention in which a cutter is used as the forming tool.

Figure 1:
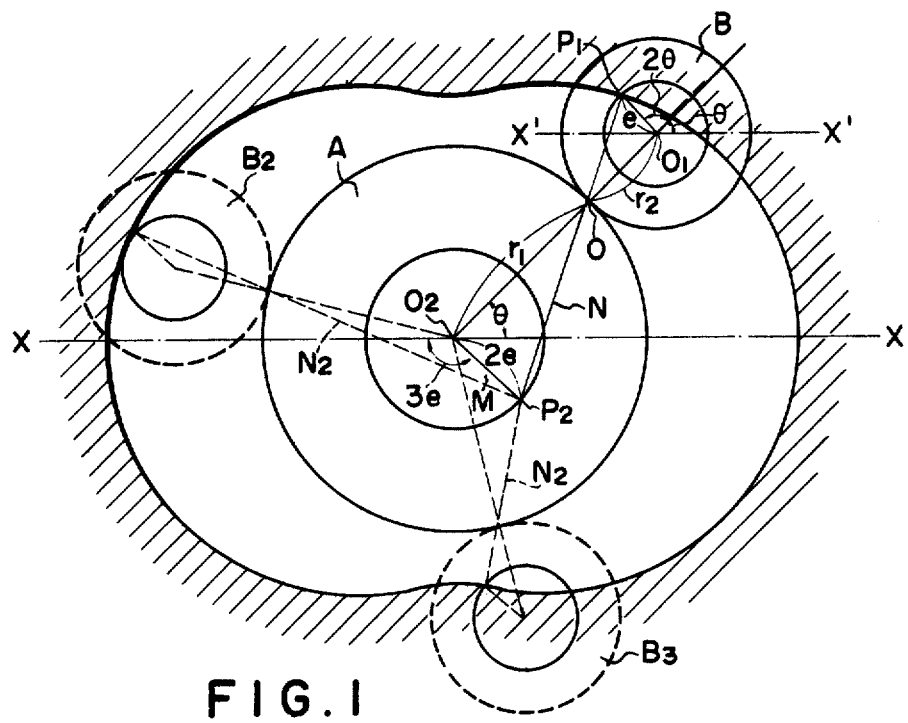
FIG. 1 is a diagrammatical view showing the principle of the mechanism in accordance with the present invention.
Figure 3:
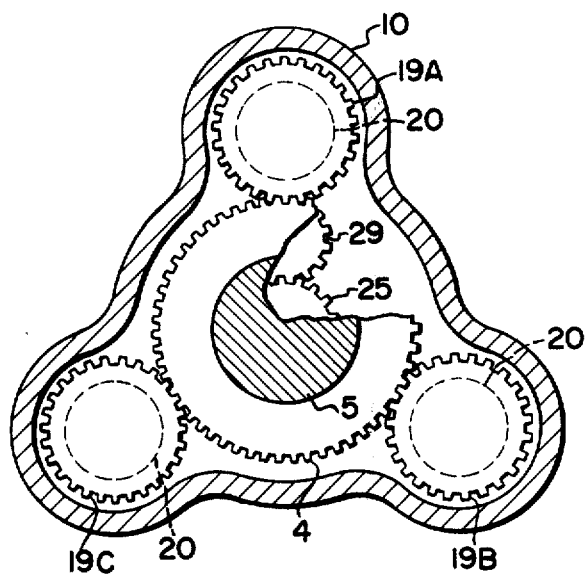
FIG. 3 is a sectional view taken along the line III—III in FIG. 2.

Referring now to the drawings, particularly to FIG. 1, there is diagrammatically shown a trochoidal surface forming apparatus which comprises a stationary sun gear A and three planetary gears B meshing with the sun gear A at equidistant angular positions thereon. Each of the planetary gears B has a gear ratio of 1:2 to the sun gear. Assuming that each planetary gear B is revolved about the sun gear A, a point $P_1$ on the planetary gear offset by a distance e from the center $O_1$ thereof traces a two-lobed trochoidal curve. In order to form a trochoidal surface by means of a forming tool such as a grinder combined with the above mechanism, it is preferable to force the tool toward the surface to be formed along a line normal to the surface, said line passing through a point of contact of the tool with the surface to be formed and the meshing point O between the sun gear A and the planetary gear B.

Representing the radius of the sun gear A by $r_1$, the radius of the planetary gear B by $r_2$ ($r_1=2r_2$), the distance of offset of the point $P_1$ from the center $O_1$ of the planetary gear B by $e$, a point offset from the center $O_2$ of the sun gear A by a distance $2e$ by $P_2$, and the meshing point between the gears A and B by O, it is apparent that the triangle $O_1P_1O$ is similar to the triangle $O_2P_2O$ as long as the line $O_1P_1$ is parallel with the line $O_2P_2$. In this arrangement, the line $P_1P_2$ is normal to the trochoidal surface to be formed.

Therefore, in an arrangement in which a lever N is disposed along said normal line $P_1P_2$, and a crank arm M is disposed along the radial line $O_2P_2$, with one end of said lever N pivotally connected at the point $P_2$ with said crank arm M, and the other end axially slidably connected with the planetary gear B at the point $P_1$, the point $P_1$ traces a two-lobed trochoidal curve as the planetary gear B is revolved about the stationary sun gear A.

Assuming that the planetary gear B is revolved by an angle $\theta$ about the sun gear A as shown in FIG. 1, the point $P_1$ on the planetary gear B is in effect rotated about the center $O_1$ by an angle $3\theta$. Since the line $P_1O_1$ is parallel with the line $P_2O_2$, the crank arm M is at this instance rotated about the center $O_2$ of the sun gear A by an angle $3\theta$. In other words, as the planetary gear B moves about the sun gear A by a complete one revolution, the crank arm M is rotated by three complete rotations. Therefore, in this arrangement, it is possible to dispose three planetary gears as shown by B, $B_2$, and $B_3$ about the sun gear A at equidistant angular positions with levers N, $N_2$ and $N_3$ pivotally connected at the common point $P_2$ to the common crank arm M.

Figure 2:
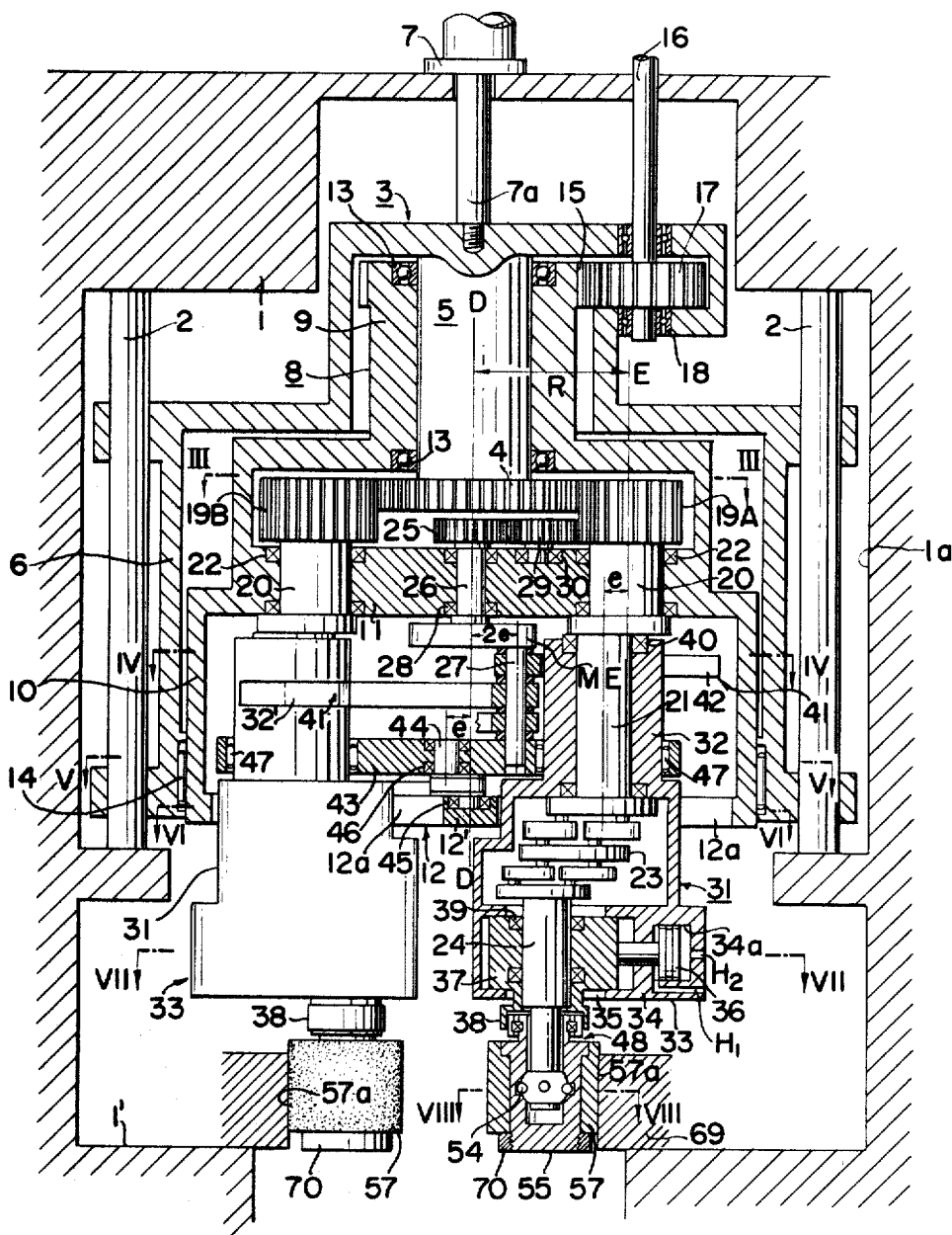
FIG. 2 is a sectional view of the trochoidal surface grinding apparatus in accordance with one embodiment of the present invention.

FIGS. 2 through 10 show one example of the honing apparatus embodying the above principle. Referring to the drawings, the apparatus includes a supporting base (1) having a cavity (1a) formed therein and provided with a pair of guide bars (2) disposed at the opposite side portions of the cavity. In the cavity (1a), there is disposed a head assembly (3) including an inwardly projecting shaft (5) having a sun gear (4) at its end and a cylindrical casing (6) which is slidably carried by the guide bars (2). The head assembly (3) is connected to a piston rod (7a) of a fluid cylinder assembly (7) which is mounted on the base (1). Thus, the head assembly (3) is vertically movable as seen in FIG. 2. In this casing (6), there is disposed a revolving member (8) having a cylindrical portion (9) supported through bearings (13) by the shaft (5) and a hollow body portion (10) supported through bearings (14) by the cylindrical casing (6) of the head assembly (3). The cylindrical portion (9) on the revolving member (8) has an external gear portion (15) which meshes with a drive gear (17). The drive gear (17) is driven through a drive shaft (16) connected thereto from an appropriate power source (not shown), the rotation of the gear (17) being transmitted through the gear portion (15) to the revolving member (8). In the revolving member (8), there is provided a first support wall (11) which rotatably carries through bearings (22) three shafts (20) which are disposed at equidistant angular positions along a circle having a radius R and a center aligning with the axis D—D of the shaft (5). Each of the shafts (20) has at one end a planetary gear (19A), (19B) or (19C) which meshes with the sun gear (4) and has a gear ratio of 1:2 to the sun gear.

At the other end of the shafts (20), there is integrally provided an eccentric shaft (21) which is offset by a distance $e$ from the axis E—E of the shaft (20). The eccentric shaft (21) carries a tool shaft (24) through a rotation transmitting mechanism (23) such as a Schmitt coupling as disclosed by German Pat. Nos. 1,224,100 and 1,233,667. The mechanism (23) is employed for the purpose that the tool shaft (24) can be displaced with respect to the shaft (21) while the former is driven by the latter. Thus, it will be understood that as the revolving member (8) is rotated about the shaft (5) with an angular velocity $\theta$, the planetary gears (19A), (19B) and (19C) are revolved about the sun gear A with an angular velocity $2\theta$, so that the planetary gears are in effect rotated about their own axes with an angular velocity $3\theta$. Therefore, the eccentric shafts (21) are rotated at an angular velocity of $3\theta$.

The first support wall (11) further rotatably carries a gear (25) at its shaft (26) through bearings (28) at a position coaxial with the shaft (5). The gear (25) has a gear ratio of 2:3 to the planetary gear and engages, through an idler gear (29) rotatably supported by a bearing (30) on the support wall (11), with the planetary gear (19A). Thus, the gear (25) is rotated with an angular velocity of $3\theta$ when the planetary gear (19A) is rotated about its own axis with an angular velocity of $2\theta$. In other words, the gear (25) is rotated at the same speed as the eccentric shaft (21).

Each of the eccentric shafts (21) carries through bearings (40) a tool head (31) comprising a swingable head casing (32) enclosing the rotation transmitting mechanism (23). The tool head (31) includes a tool feeding mechanism (33) comprising a bearing block (37) which rotatably supports the tool shaft (24) through bearings (39) and is received in a cylinder block (34) of the swingable head casing (32) slidably in the direction perpendicular to the tool shaft (24). The cylinder block (34) has a cylinder chamber (34a), and a piston (36) connected with the bearing block (37) is reciprocably disposed in the cylinder chamber (34a). The opposite ends of the cylinder chamber (34a) is connected through passages $H_1$ and $H_2$ with a suitable hydraulic pressure circuit (not shown).

Figure 4:
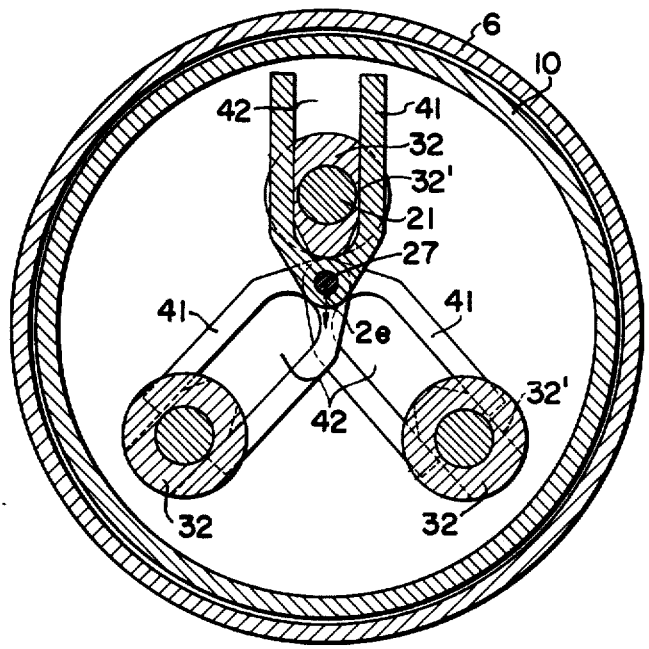
FIG. 4 is a sectional view taken along the line IV—IV in FIG. 2.

The shaft (26) has at the end opposite to the gear (25) a pin (27) which extends parallely with the axis D—D of the shaft (5) and is offset therefrom by a distance $2e$. On the pin (27), there are pivotally mounted three levers (41) at their ends. Each of the lever (41) is of a bifurcated shape as shown in FIG. 4 so as to define a guide slit (42) opening toward the free end thereof. The swingable head casing (32) has a pair of parallel guide surfaces (32') on its external surface for sliding engagement with the guide slit (42) of the lever (41) as clearly shown in FIG. 4. Thus, it will be understood that as the pin (27) and each shaft (21) are moved along their respective circular paths, the casing (32) is caused to swing about the related shaft (21) due to the guiding engagement between the casing (32) and the lever (41), so that the direction of movement of the bearing block (37) is always normal to the trochoidal surface to be formed. It should further be noted that the direction of offset of the pin (27) from the shaft (26) is opposite to that of the shaft (21) from the shaft (20).

Figure 5:
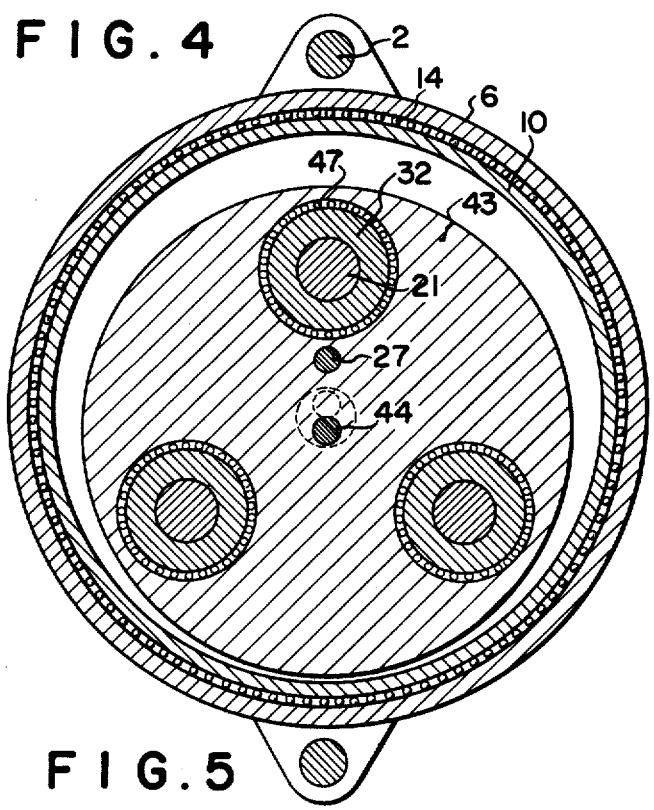
FIG. 5 is a sectional view taken along the line V—V in FIG. 2.
Figure 6:
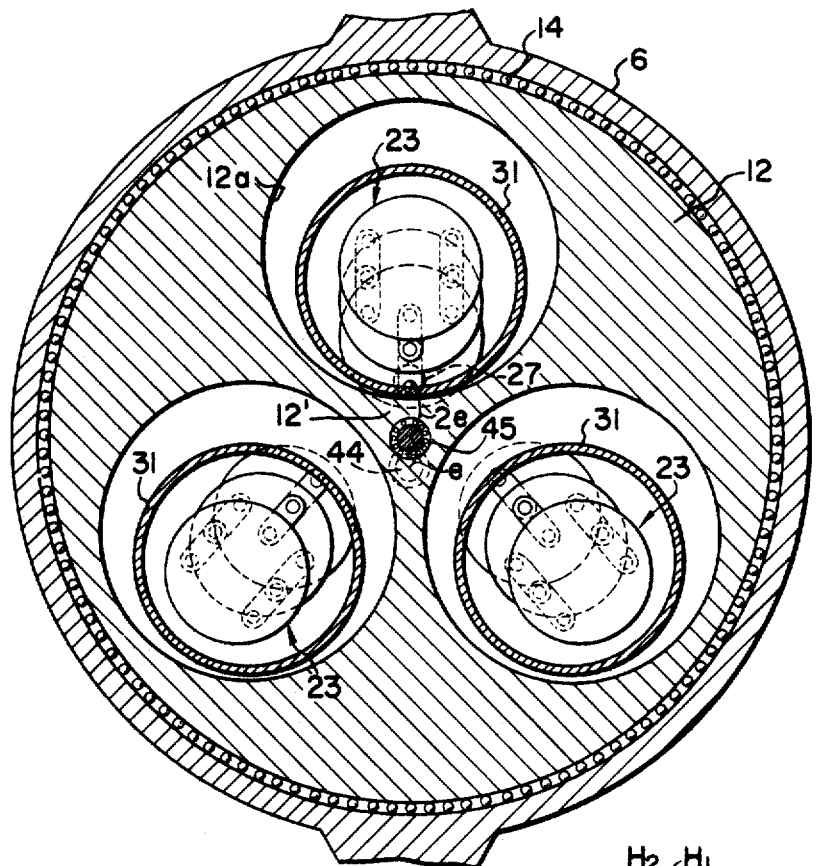
FIG. 6 is a sectional view taken along the line VI—VI in FIG. 2.
Figure 7:
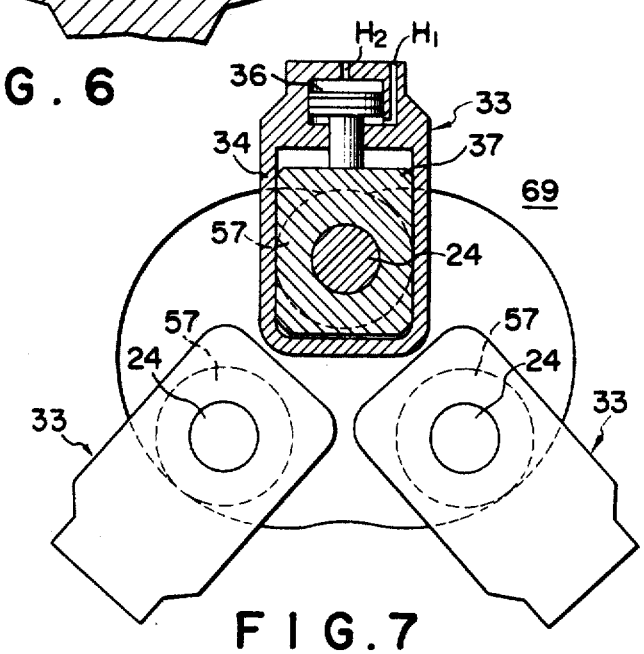
FIG. 7 is a sectional view taken along the line VII—VII in FIG. 2.
Figure 8:
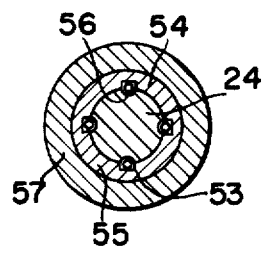
FIG. 8 is a sectional view taken along the line VIII—VIII in FIG. 2.
Figure 9:
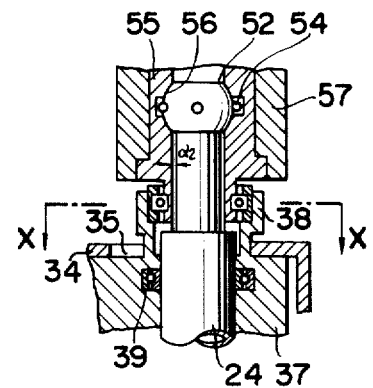
FIG. 9 is an enlarged sectional view of the floating direction control ring shown in FIG. 2.

As shown in FIGS. 2 and 5, the swingable casings (32) are supported through bearings (47) by a support disc (43) which is supported by a second support plate (12) on the revolving member (8) by an eccentric pin (44) which is received at one end through bearings (45) in the second support plate (12) at a position coaxial with the shaft (26) and at the other end through bearings (46) in the center of the disc (43), so that the disc (43) is offset by a distance $e$ from the axis D—D in the direction opposite to the direction of offset of the pin (27) from the axis D—D. The second support plate (12) has three holes (12a) through which the swingable casings (32) project outwardly. The disc (43) serves to maintain the relative positions of three swingable casings (32).

Figure 10:
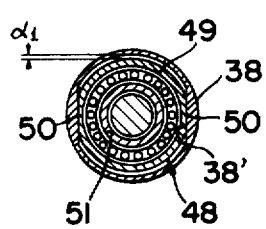
FIG. 10 is a sectional view taken along the line X—X in FIG. 9.

The bearing block (37) has a portion extending through an opening (35) formed in the cylinder block (34), and the extended portion is provided with an annular socket (38) at its free end. As shown in FIG. 10, the socket (38) has a pair of parallel flat inner walls (38') which engage with corresponding parallel outer surfaces (50) formed in the outer racing (49) of a bearing assembly (48). The bearing assembly (48) constitutes a floating direction control ring and has an inner racing (51) which is integral with a floatable tool adapter (55). The socket (38) has a clearance $\alpha_1$ with the outer racing (49) except the area of the flat surfaces (50) so that the bearing assembly (48) is swingable within a limited range in the direction parallel with the flat surfaces (50). The adapter (55) has a spherical inner surface (56) which engages with a spherical portion (52) on the tool shaft (24). Steel balls (54) disposed between the spherical portion (52) and the spherical inner surface (56) of the adapter (55) makes a driving connection therebetween, so that the rotation is transmitted from the tool shaft to the tool adapter (55) while the adapter (55) is allowed to swing within a limited range as permitted by a clearance $\alpha_2$ between the adapter (55) and the tool shaft (24). The tool adapter (55) carries a grinder (57).

Thus, the arrangement has been described with reference to the planetary gear (19A), however, it should be understood that identical mechanisms are provided for the gears (19B) and (19C).

In operation, a workpiece (69) is placed in position on the base (1) and the grinders (57) are brought into engagement with the inner surface thereof, with the working surface (57a) in alignment with the axis E—E of the shaft (21). Then, the drive shaft (16) is rotated and the cylinder (7) is actuated to reciprocate the now rotating grinders (57). As already described with reference to FIG. 1, the shafts (21) and thus the working surfaces of the grinders (57) are moved along a two-lobed trochoidal curve by the planetary gears (19A) so that the trochoidal inner surface of the workpiece (69) is ground by the grinders. The gear (25) is coaxial with the shaft (5) on the casing (3) and is rotated 1.5 times the rotational speed of each planetary gear (19A) about its own axis, so that the pin (27) is moved at an angular speed equal to that of the shaft (21). Therefore, each of the levers (41) extending between each of the swingable casings (31) and the pin (27) is always disposed in the direction normal to the trochoidal surface to be formed. Since the direction of movement of the bearing block (37) in the tool feeding mechanism is determined by the direction of the guide slit (42) in the related lever (41), the bearing block (37) and thus the tool (57) is always advanced in the direction normal to the trochoidal surface when fluid pressure is supplied through the passage $H_1$ into the cylinder chamber (34a). In the illustrated arrangement, the grinder (57) may be advanced at a constant rate by adding a predetermined rate of fluid into the chamber (34a) through the passage or urged under a constant pressure onto the work surface by applying a constant fluid pressure through the passage $H_1$. The previously described floating direction control means is effective to place the working surface of the honing grinder (57) along the inner trochoidal surface of the workpiece, however, it should be noted that a cutting tool is used in the place of the honing grinder (57), the tool may be securely mounted on the tool shaft (24).

Figure 11:
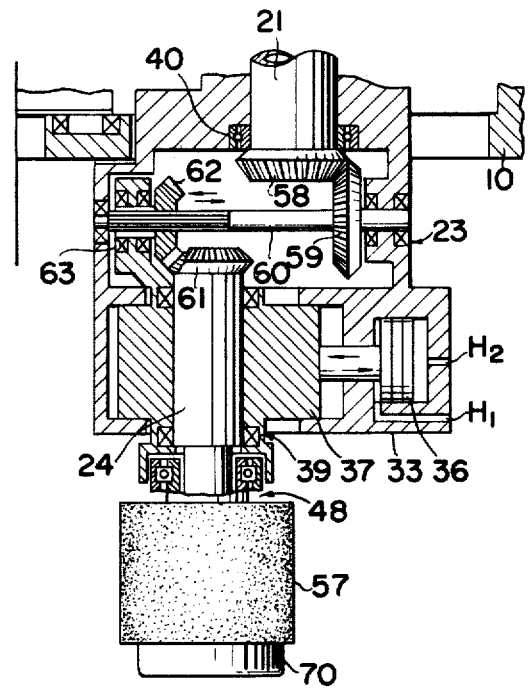
FIG. 11 is a sectional view showing another form of the rotation transmitting mechanism.

FIG. 11 shows an alternative arrangement of the rotation transmitting mechanism (23). In this arrangement, the shaft (21) has a bevel gear (58) at its free end. A shaft (60) perpendicular to the shaft (21) is rotatably supported by bearings (63) and carries a bevel gear (59) secured thereto and meshing with the gear (58). The shaft (60) further carries a bevel gear (62) which is axially slidable with respect to the shaft (60) and meshing with a bevel gear (61) provided on the inner end of the tool shaft (24). It should be noted that the mechanism can effectively transmit the rotation of the shaft (21) to the tool shaft (24) while permitting relative movement between the shafts (21) and (24) so that the working surface of the grinder (57) is always positioned in alignment with the axis of the shaft (21).

FIGS. 12 (a), (b) and (c) show a further example of the rotation transmitting mechanism (23) which includes a gear (64) secured to the end of the shaft (21) which meshes through idler gears (66) and (67) with a gear (65) secured to the end of the tool shaft (24). As shown in FIGS. 12 (b) and (c), the gears (64), (65), (66) and (67) are interconnected by a parallel linkage (68) so that the tool shaft (24) can be displaced with respect to the shaft (21).

FIG. 13 shows an arrangement in which a cutting tool (71) is secured to the tool shaft (24). In this arrangement, the shaft (21) is not connected with the tool shaft (24), but has a flange (21a) at its end for preventing the swingable casing (31) from being disengaged from the shaft (21). A splined shaft (73) extends in the casing (31) in the direction perpendicular to the shaft (21) and connected with a motor ($M_1$) at one end to be driven thereby. The shaft (73) axially slidably carries a bevel gear (72) which meshes with a bevel gear (75) at the adjacent end of the tool shaft (24). The bearing block (37) has an extension (37a) for supporting the bevel gear (72) through bearings (74) at a sleeve portion (72a) on the gear (72), so that the gear (72) is prevented from being disengaged from the gear (75). The bearing block (37) has a threaded bore (76) which engages with a threaded shaft (77) of a motor $M_2$. Thus, when the motor $M_1$ is energized, the rotation is transmitted to the tool shaft (24) and the tool (71) can be advanced by energizing the motor ($M_2$).

The invention has been shown and described with reference to specific embodiments, however, it should be noted that the invention shall in no way limited to the details of the illustrated embodiments but changes and modifications can be made without departing from the scope of the appended claims.

What is claimed is:

1. Apparatus for forming a trochoidal surface comprising a stationary sun gear, a plurality of planetary gears disposed around and meshing with said sun gear at equ-distant angular positions, each of said planetary gears having a gear ratio of 1:2 to said sun gear, a plurality of rotatable forming tools each having a working surface, one of said forming tools being mounted on each of the planetary gears so that the forming tool working surface is positioned at a point offset by a predetermined distance from the center of the associated planetary gear, means for revolving said planetary gears, a plurality of tool mounting heads for mounting each of said forming tools on the associated planetary gear, each of said tool mounting heads comprising a swingable arm axially slidably engaging said tool and a planetary gear shaft for carrying said swingable arm, said shaft being coaxial with said offset point on the associated planetary gear, a plurality of levers extending along a line through said offset point on each planetary gear and intersecting said meshing point between the related planetary gear and the sun gear, said lever having one end longitudinally slidably receiving the related swingable arm, the other end of the lever being pivotally mounted on a member which is rotatable about an axis coaxial with said sun gear at a common point offset from the axis of the sun gear a distance equal to two times the offset distance of the offset point associated with each planetary gear, and means for displacing each of said forming tools along said swingable arm so as to compensate for any wear of the working surface thereof.

2. Apparatus according to claim 1, including a plurality of tool shafts, each of said tools being mounted on an associated tool shaft, said planetary gear shafts being offset from said tool shafts, and means for transmitting rotation between said planetary gear shafts and said tool shafts, said means being mounted to allow relative displacement between said planetary shafts and said tool shafts.

3. Apparatus in accordance with claim 1 including three planetary gears.

4. Apparatus in accordance with claim 1 in which each of said forming tools comprises a grinding wheel.

5. Apparatus in accordance with claim 1 in which each of said forming tools comprises a rotatable cutting tool.

6. Apparatus in accordance with claim 1 in which each of said levers is of a bifurcated shape and slidably receives a related swingable arm in an outwardly opening axially extending slit.

7. Apparatus in accordance with claim 2 in which each of said tool feeding means comprises a bearing block rotatably carrying the associated tool shaft and being carried by the associated swingable arm slidably along the associated lever, and fluid pressure means for moving said bearing block.

8. Apparatus in accordance with claim 2 in which each of said tools comprises a honing wheel and mounting means on said tool shafts for permitting swinging movement of the tool within a limited range.

9. Apparatus in accordance with claim 1 in which each of said tools is mounted on a tool shaft which is offset from the associated planetary gear shaft, means for rotating said tool shaft through a rotation transmitting mechanism, said means allowing relative displacement between said two shafts.

10. Apparatus in accordance with claim 9 in which said tool feeding means comprises a bearing block for rotatably carrying said tool shaft, said block being carried by said swingable arm slidably along said lever, and motor driven screw thread means for moving said bearing block.

* * * * *